United States Patent [19]
Chass

[11] Patent Number: 5,701,114
[45] Date of Patent: Dec. 23, 1997

[54] ROTARY VARIABLE DIFFERENTIAL TRANSFORMERS

[76] Inventor: Jacob Chass, 70-25 Yellowstone Blvd., Forest Hills, N.Y. 11375

[21] Appl. No.: 689,032

[22] Filed: Jul. 30, 1996

[51] Int. Cl.⁶ .................................................. H01F 21/06
[52] U.S. Cl. ........................ 336/115; 336/132; 336/133; 336/134; 336/135
[58] Field of Search ................................ 336/135, 134, 336/133, 132

[56] References Cited

U.S. PATENT DOCUMENTS

| | | | |
|---|---|---|---|
| 3,491,321 | 1/1970 | Chass | 336/130 |
| 3,551,866 | 12/1970 | Chass | 336/135 |
| 3,573,693 | 4/1971 | Chass | 336/135 |
| 3,882,436 | 5/1975 | Chass | 336/83 |
| 4,551,699 | 11/1985 | de Jong et al. | 336/135 |
| 4,910,488 | 3/1990 | Davis et al. | 336/83 |

*Primary Examiner*—Michael L. Gellner
*Assistant Examiner*—Anh Mai

[57] ABSTRACT

A Rotary Variable Differential Transformer, having a short axial length, small diameter, and a wide angle, linear output range, is provided. The Rotary Variable Differential Transformer (RVDT) comprised of a housing, a hollow cylindrical coil form made of non-magnetic, non-conductive material, about which a first and second secondary coils, adjacent to each other, are circumferentially wound. A primary coil is circumferentially wound about a segment of said first secondary coil, and about a segment of said second secondary coil.

An elongated ferromagnetic core is disposed within the hollow coil form. The core is an axial section of a ferromagnetic cylinder which serves to couple said primary coil to said secondary coils.

The output voltage measured across said secondary coils terminals is indicative of the angular position of said ferromagnetic core relative to the coil form assembly.

19 Claims, 10 Drawing Sheets

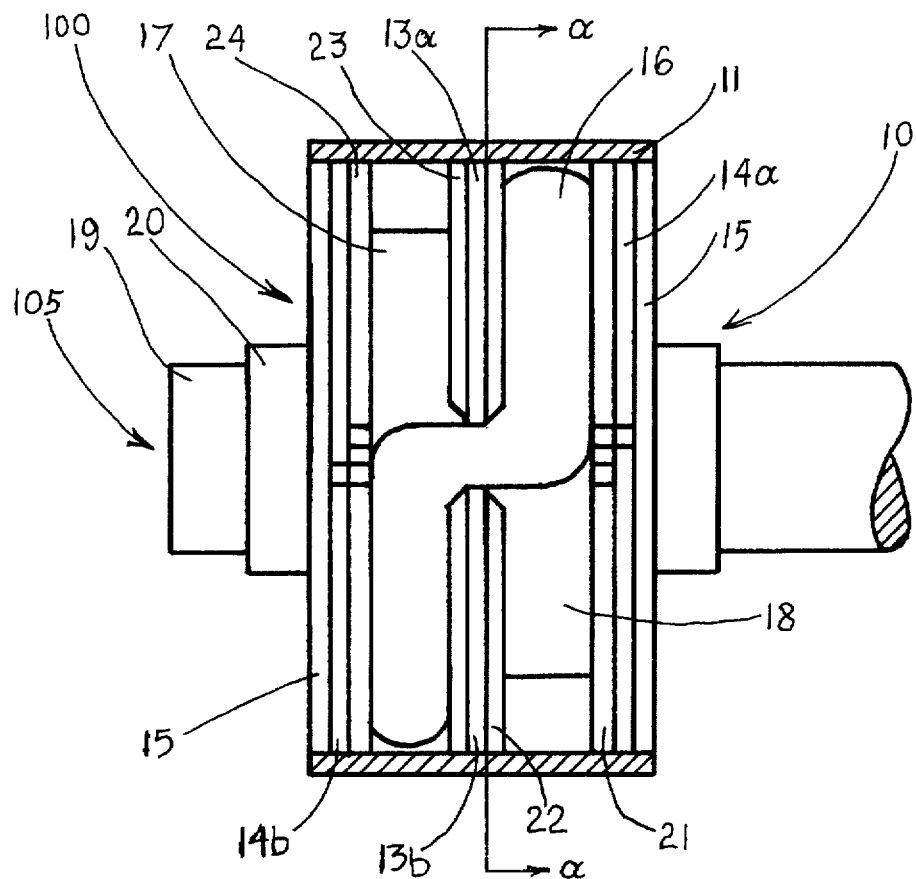
FIG. 2
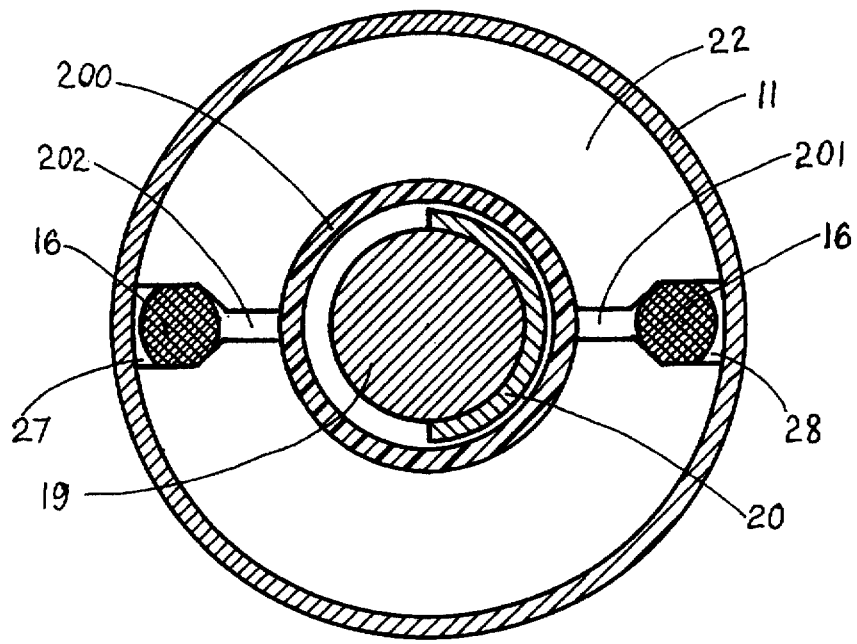
FIG. 2α

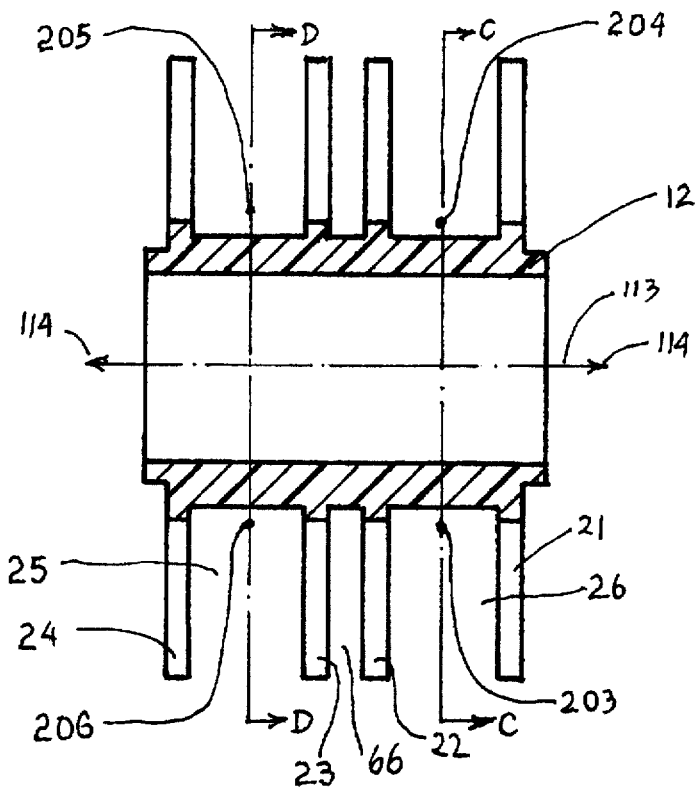
FIG. 3f
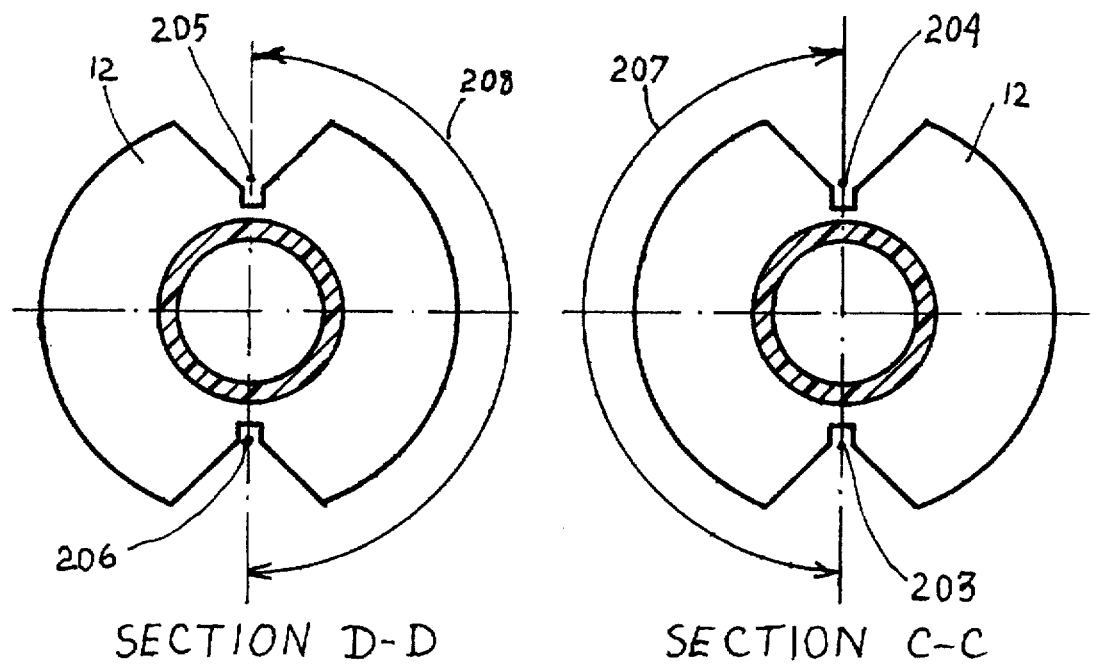
SECTION D-D
FIG. 3h
SECTION C-C
FIG. 3g

ROTARY VARIABLE DIFFERENTIAL TRANSFORMERS

CROSS REFERENCES

U.S. Pat. Nos:

| | | | |
|---|---|---|---|
| 3,491,321 | 1/1970 | Chass | 336/130 |
| 3,551,866 | 12/1970 | Chass | 336/135 |
| 3,882,436 | 5/1975 | Chass | 336/83 |
| 4,910,488 | 3/1990 | Davis | 336/83 |

BACKGROUND OF THE INVENTION

The present invention relates to a rotary variable differential transformer. It is a transducer utilized to translate a variable angular position of a shaft to a variable electrical voltage. The rotary variable differential transformer consists of two assemblies: a stator and a rotor. The stator assembly includes a housing, a coil form, two secondary coils connected in opposition, and a primary coil. The rotor assembly includes a ferromagnetic core attached to a non-magnetic shaft. The rotor assembly is inserted into the hollow stator assembly. The angular position of the ferromagnetic core in relation to the stator determines the magnetic coupling between the primary coil and the secondary coils. The secondary output voltage is indicative of the rotor angular position.

Prior art includes U.S. Pat. No. 4,910,388 March 1990 C. C. DAVIS, D. M. POTTER, Rotary Variable Differential Transformer with eccentric rotor core. A change in the angular position of the rotor in relation to the stator will cause a radial change of the gap in the magnetic circuit, which in turn causes a change in the output voltage. This principle of work has two detriments the first is Large stator diameter and poor performance due to temperature variation. Since the structure of the transducer is asymmetrical and the temperature coefficient of expansion of its various parts is not uniform, a change in temperature will cause a change in the gap in the magnetic circuit when at a stationary rotor position.

Prior art also includes U.S. Pat. No. 3,551,866, December 1970, J. CHASS Rotary Variable Differential Transformer. The advantages of the presented invention over U.S. Pat. No. 3,551,866 are:

1. Shorter axial length. In the presented invention, the axial length of the Rotary Variable Differential Transformer is about one half of the Rotary Variable Differential Transformer of U.S. Pat. No. 3,551,866.

2. The presented invention includes two regular secondary coils wound circumferentially about its coil form. The Rotary Variable Differential Transformer of U.S. Pat. No. 3,551,866 includes four folded secondary coils. These additional coils increase the cost of manufacturing.

3. The principal object of this invention is to provide a rotary variable differential transformer having a very short axial length and a small diameter.

A further object of this invention is to provide a rotary variable differential transformer having a linear output voltage over a wide angular displacement range.

A still further object of this invention is to provide a rotary variable differential transformer which is simple in design and inexpensive to construct.

SUMMARY OF THE INVENTION

The above and other objectives of the invention are attained by the inventive Rotary Variable Differential Transformer which comprises a stator assembly and a rotor assembly. The stator assembly is comprised of:

1. A housing, comprised of a ferromagnetic shell and two washers. The washers are formed of one of the following materials: An electrically conductive, non magnetic material such as aluminum or stainless steel, non-conductive non-magnetic material such as plastic material, or ferromagnetic material.

2. A hollow coil form made of non conductive non magnetic material.

3. A primary coil.

4. Two secondary coils connected in series opposition.

5. Four coupling elements formed of ferromagnetic material.

The rotor assembly is comprised of a ferromagnetic core and non magnetic shaft. The said core is an axial section of a cylinder, and it is attached to the shaft which is disposed for rotation within the hollow stator.

The stator assembly is simple and easy to manufacture, since it includes one primary coil, two secondary coils, and four thin coupling elements; its axial length is short and it may be used in control systems and in angular position measurement devices where available axial length is limited.

BRIEF DESCRIPTION OF THE INVENTION

The invention may best be understood by reference to the accompanying drawings, wherein like parts in each of the following figures are identified by the same number or character reference and wherein:

FIG. 1 provides a schematic illustration, in section of the first embodiment of the invention.

FIG. 2 provides a schematic illustration in partial section of the first embodiment of the invention, with the shell section removed and core angular position displaced 90°.

FIG. 2a is a sectional top view of FIG. 2 taken along references lines a—a of FIG. 2 in the direction of the arrows.

Figure 3A:
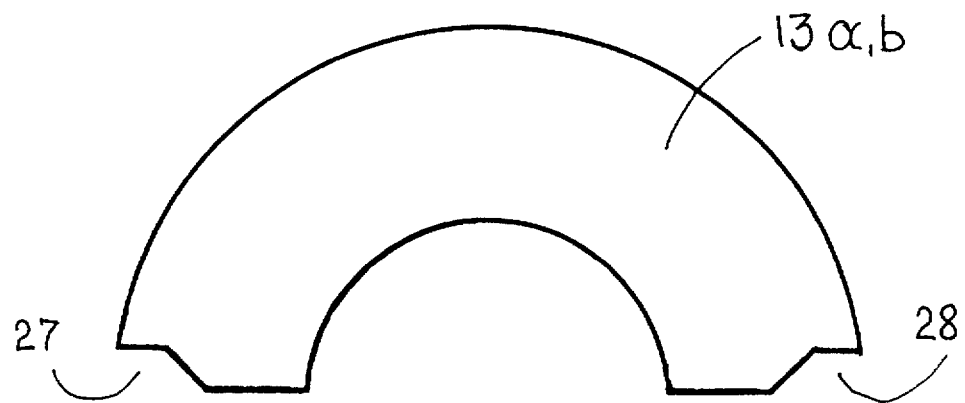
FIG. 3 illustrates magnetic elements that are part of the stator assembly.
FIG. 3c illustrates RVDT housing, axial section, showing housing axis, and housing axial direction.
FIG. 3d illustrates RVDT housing, axial section, including inner washers and external washers.
FIG. 3e illustrates front view of washer.
Figure 3B:
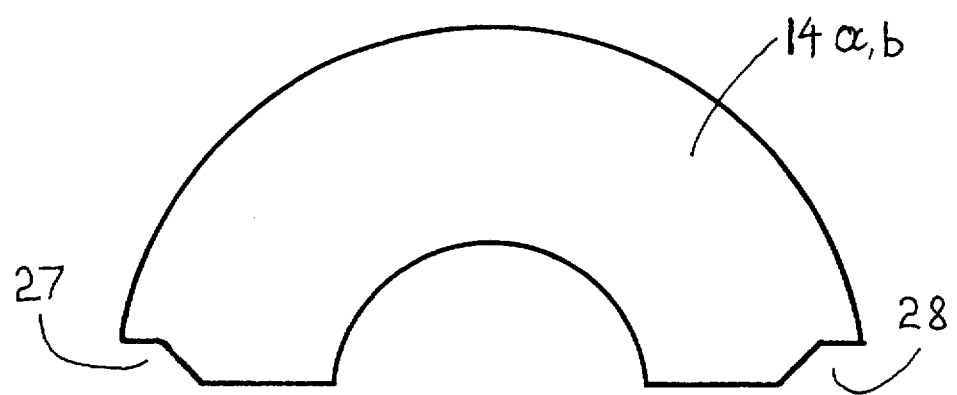
Figure 3C:
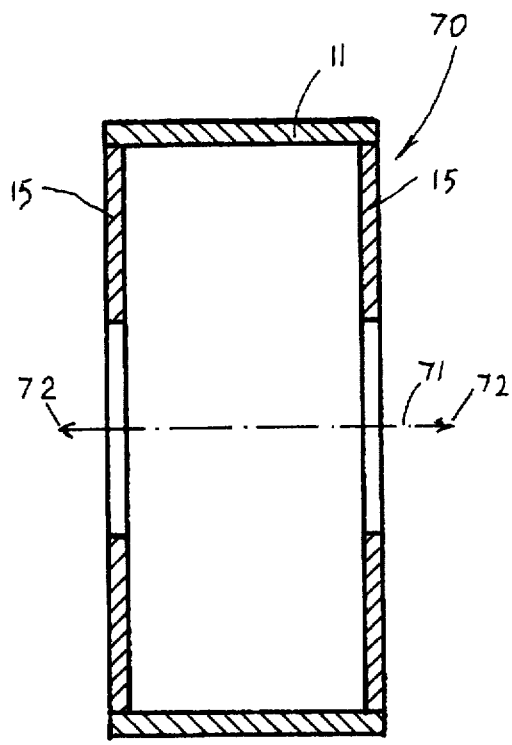
Figure 3D:
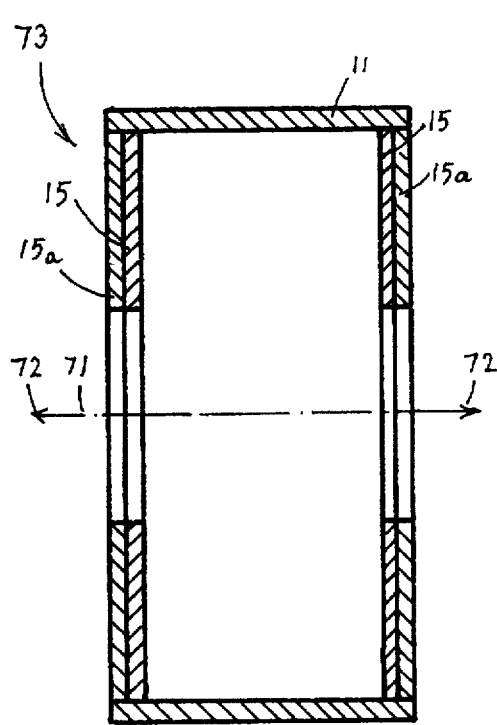
Figure 3E:
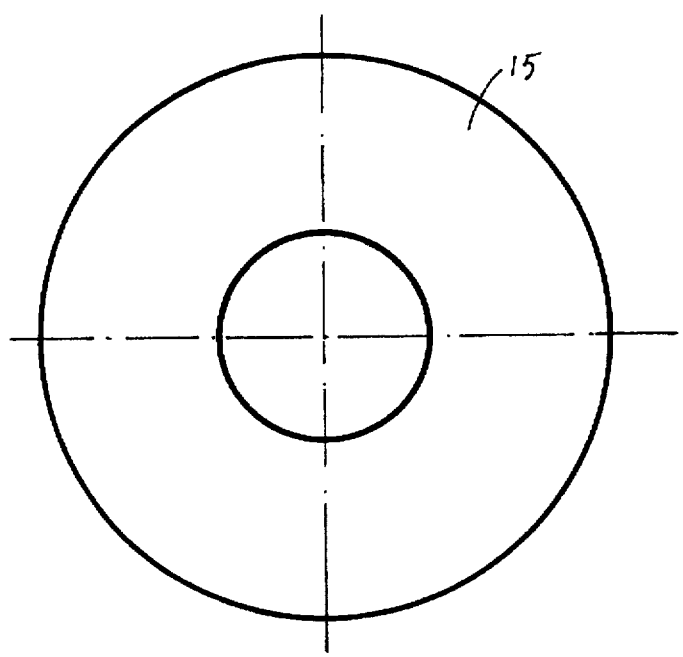
Figure 3E:
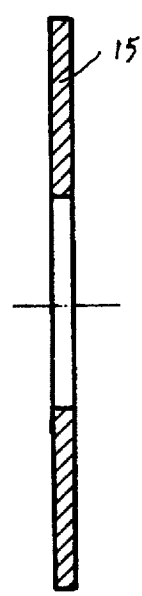

FIG. 3ee illustrates side view, in section, of washer.

FIG. 3f illustrates coil form, in section, showing axis, and axial direction of coil form.

FIG. 3g illustrates side view of coil form, in section, along C—C showing First position, Second position, and 180 of arc.

FIG. 3h illustrates side view of coil form, in section, along D—D showing Third position, Fourth position, and 180 of arc.

Figure 3I:
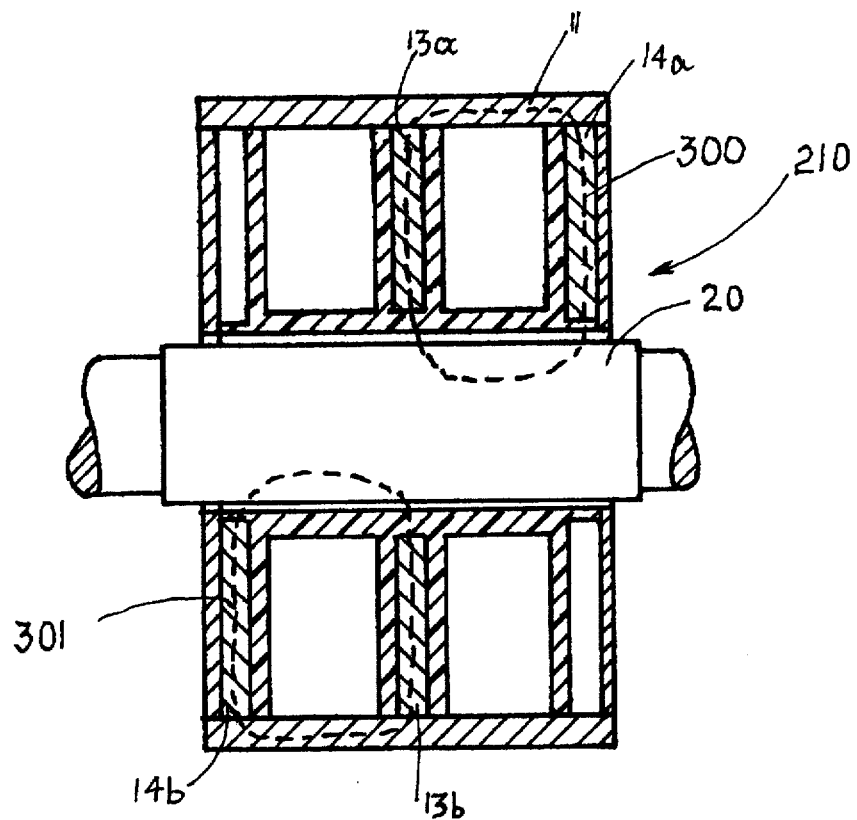

FIG. 3i illustrates housing, coil form, and rotor in partial section, showing First magnetic circuit and Second magnetic circuit.

Figure 3J:
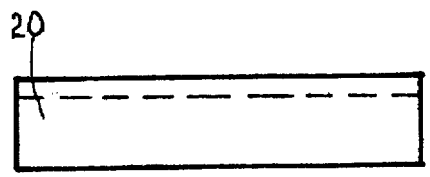
Figure 3J:
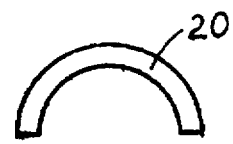

FIG. 3j illustrates side view of core.

FIG. 3jj illustrates front view of core.

Figure 3K:
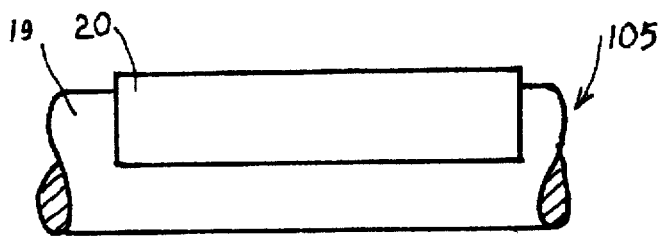
Figure 3K:
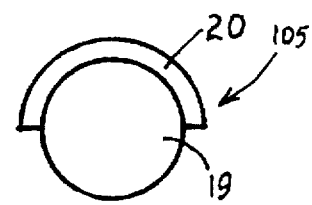

FIG. 3k illustrates side view of rotor.

FIG. 3kk illustrates front view of rotor.

Figure 4:
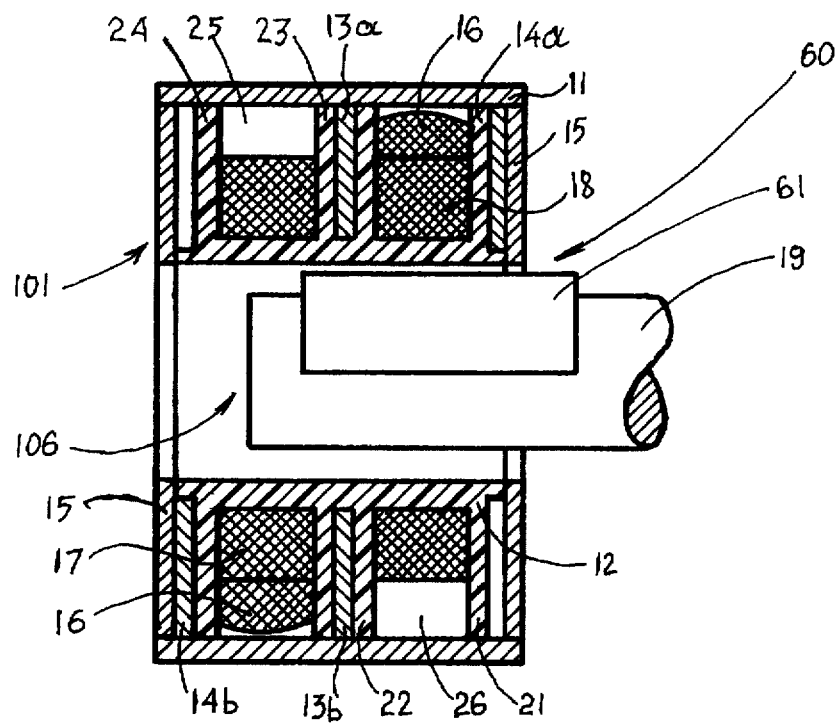

FIG. 4 provides a schematic illustration, in section, of the second embodiment of the invention.

Figure 5:
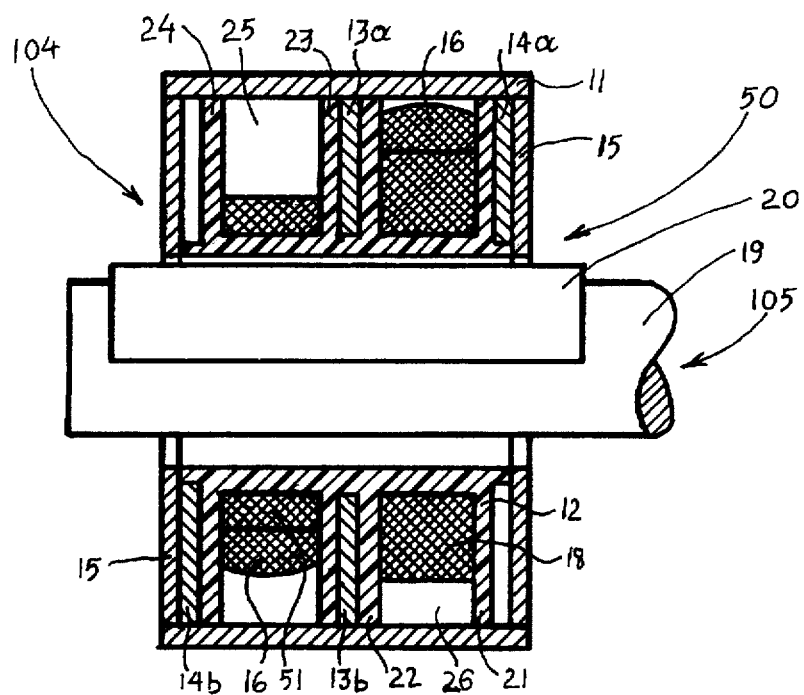

FIG. 5 provides a schematic illustration, in section of the third embodiment of the invention.

Figure 6:
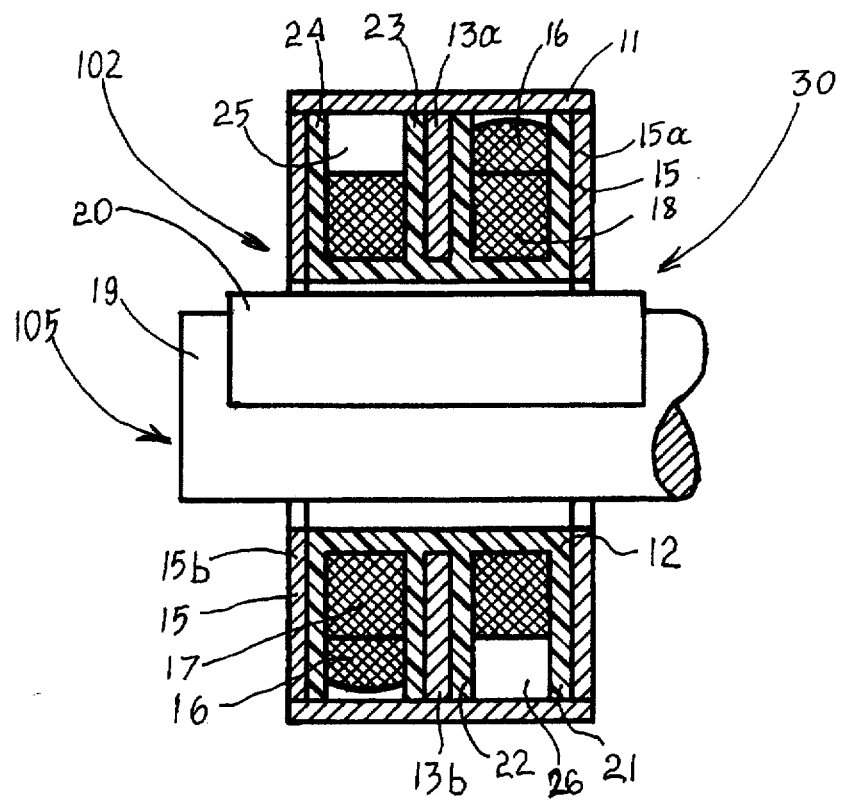

FIG. 6 provides a schematic illustration, in section, of the fourth embodiment of this invention.

Figure 7:
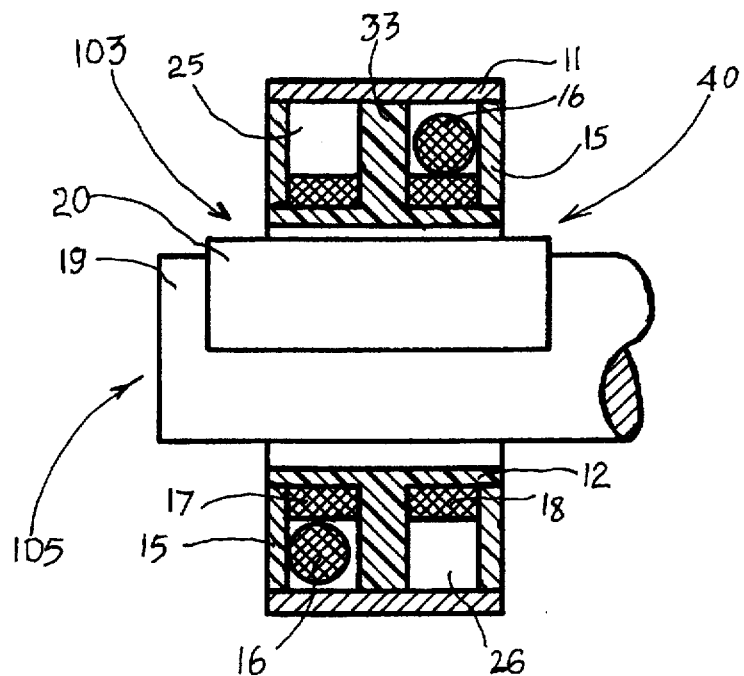

FIG. 7 provides a schematic illustration, in section, of the fifth embodiment of the invention.

Figure 8:
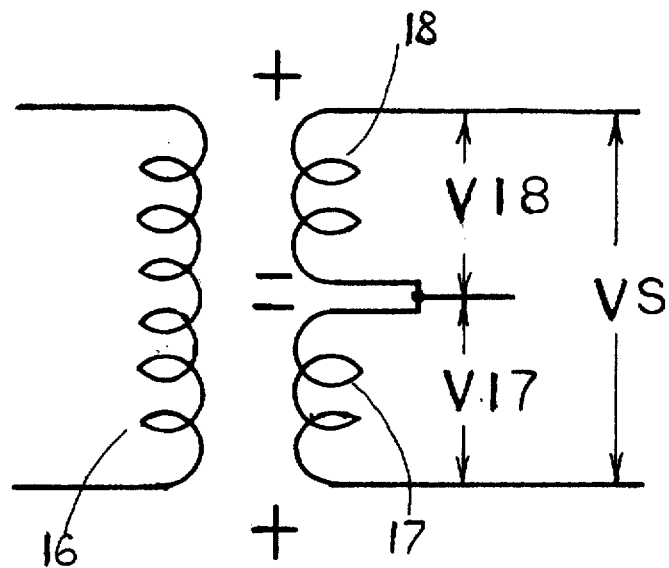

FIG. 8 is an electrical schematic illustrating the primary and secondary coils of a Rotary Variable Differential Transformer (RVDT).

Figure 9:
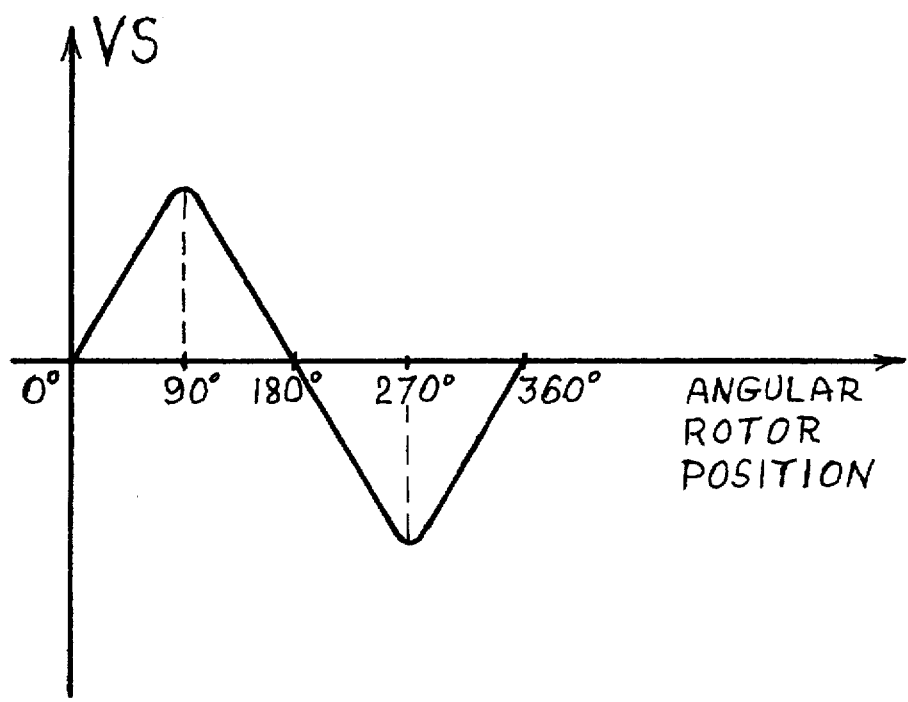

FIG. 9 is a graph illustrating the voltage output; angular displacement relation for the first, fourth and fifth embodiments of the invention.

Figure 10:
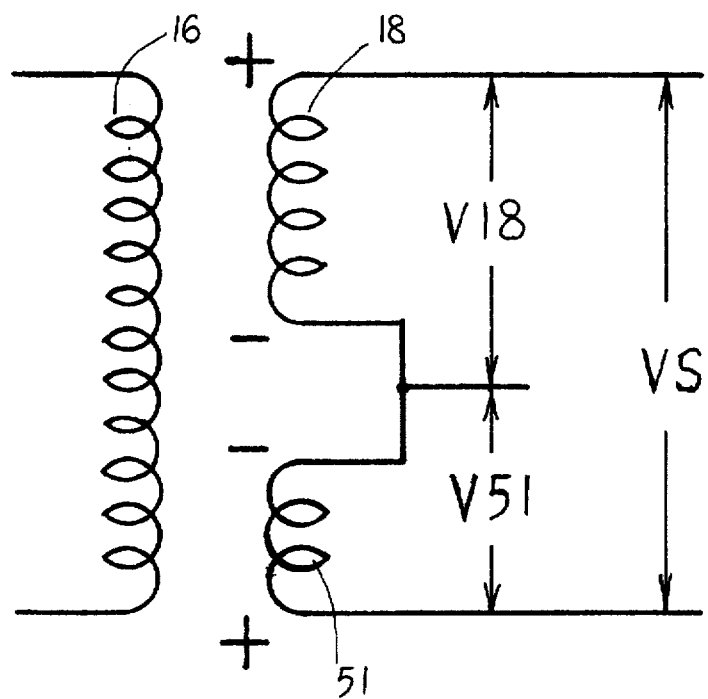

FIG. 10 is an electrical schematic illustrating the primary and secondary coils of a rotary variable differential transformer wherein the number of turns of one secondary coil is different from the number of turns of the other secondary, see FIG. 5.

Figure 11:
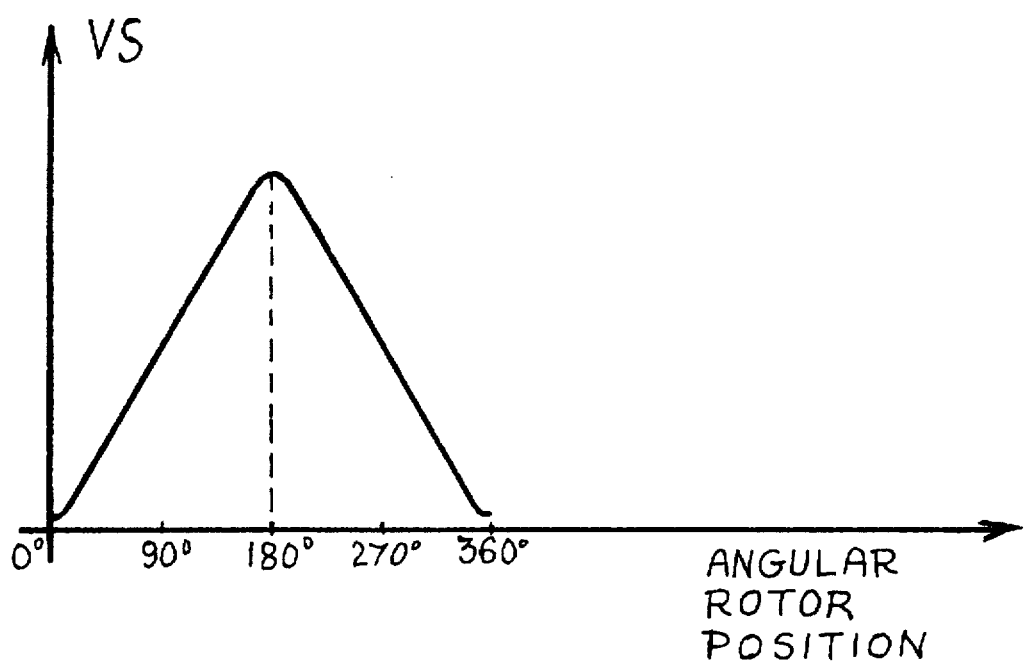

FIG. 11 is a graph illustrating the voltage output: angular displacement relation for the second and third embodiment of the invention.

Although the invention has been described with specific reference to five embodiments and modifications thereof, it will be apparent to a knowledgeable person, upon reading this patent, that numerous modifications and alternative materials and arrangements may be devised by those skilled in the art without departing from the spirit and scope of the invention as defined by the appended claims.

DETAILED DESCRIPTION OF THE INVENTION

Figure 1:
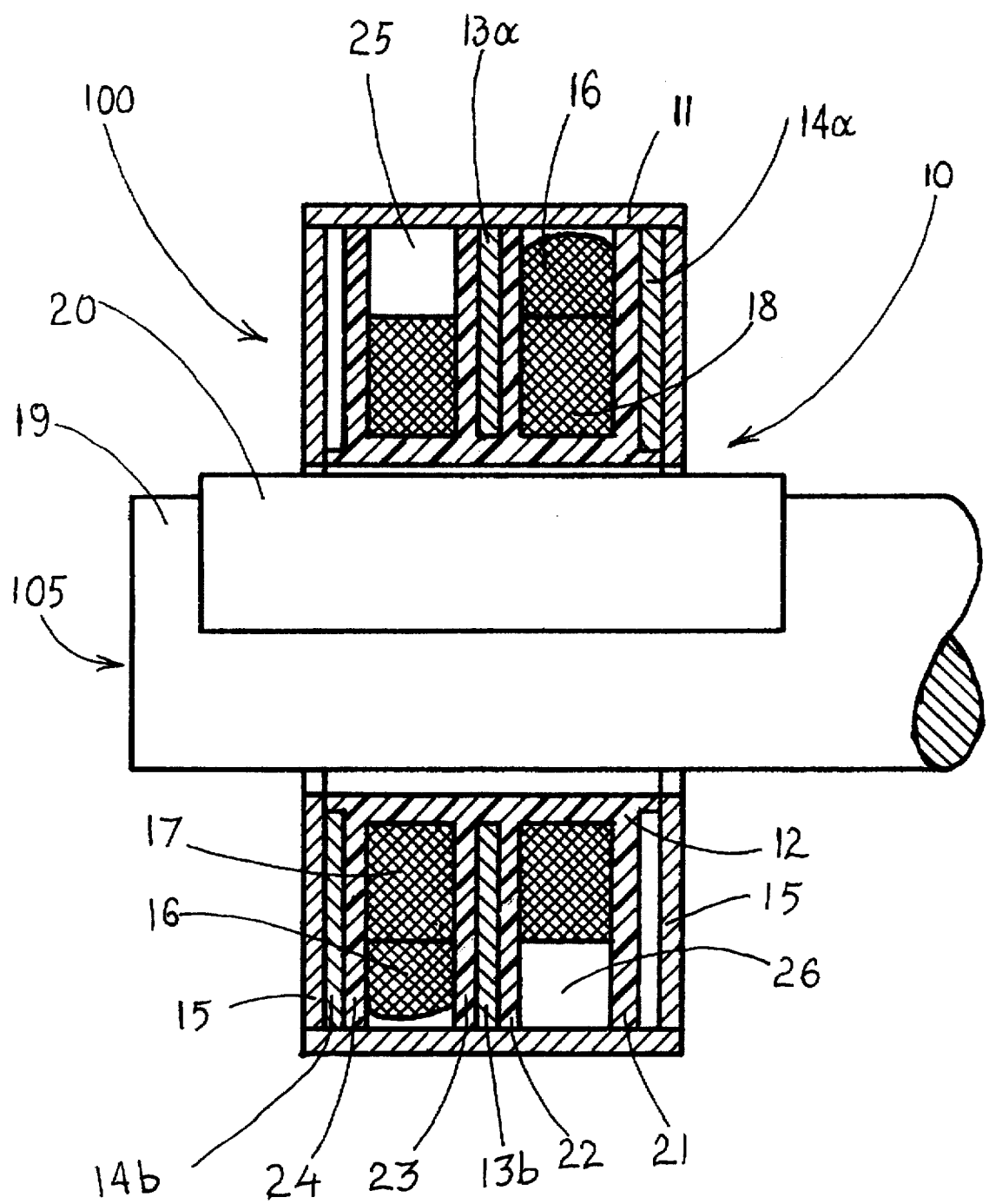

A first embodiment of the invention is shown in FIG. 1 and FIG. 2. It is a rotary variable differential transformer (RVDT) 10 comprising of a rotor assembly 105 and a stator assembly 100. The stator assembly 100 comprised of a hollow coil form 12, formed of non conductive non magnetic material about which two secondary coils 17 and 18, and a primary coil 116 are circumferentially wound. Said secondary coil 18 is designated First secondary coil; said secondary coil 17 is designated Second secondary coil.

The said secondary coils 17 and 18 are connected in series opposition either internally, within the stator assembly 100, or externally to stator assembly 100. The coil form 12 is rigidly disposed in the assembly of shell 11 and two washers 15.

The rotor assembly comprised of a ferromagnetic core 20, which is a hollow cylindrical axial section positioned for rotation within the hollow core form 12, and a shaft 19 made of non magnetic material.

The ferromagnetic core 20, is secured to the periphery of shaft 19 (see FIG. 2 and FIG. 2a).

Referring to coil form 12, four flanges 21,22,23 and 24 extend in a radial direction from the central cylinder 200, of coil form 12 said flange 21 is designated first flange, said flange 22 is designated second flange, said flange 23 is designated third flange, said flange 24 is designated fourth flange. Flange 21 and flange 24 are end flanges. Flange 22 and flange 23 are intermediate flanges. Flange 22 is notched at its periphery in two places approximately 180 apart. Flange 23 is notched at its periphery in two places, approximately 180° apart. All four said notches are situated at the intersection of an imaginary flat plane extending radially from said axis of said coil form, and the periphery of said flange 22, and the periphery of said flange 23. Said notches allow cross-over of said primary coil 16 and said electrically insulated conductive wire of secondary 17 and secondary 18".

The magnetic elements 13a and 13b shown in FIG. 3a are disposed between flange 22 and flange 23. Two equal gaps 201 and 202, see FIG. 2a, are maintained at coil form 12 central cylinder 200 corresponding to notch 27 and notch 28 in flange 22 and notch 27 and notch 28 in flange 23 (see FIG. 2a). Flange 22 and flange 23 serve to divide central cylinder 200 of coil form 12 into two approximately equal compartments, compartment 26 and compartment 25. Secondary coil 17 wound of insulated electrically conductive wire is disposed within compartment 25, and secondary 18 wound of insulated secondary electrically conductive wire is disposed within compartment 26. Secondary coil 17 and secondary coil 18 are connected in series opposition.

The primary coil 16 wound of insulated electrically conductive wire is exteded circumferentially over secondary coil 17 in compartment 25, from notch 27 to notch 28 shown in FIG. 2a. Then it extended longitudinally in coil form 12 axial direction and cross over through notch 28 into compartment 26, as shown in FIG. 2a, and wound circuferentially over secondary coil 18 from notch 28 to notch 27, and then extended longitudinally through notch 27 and cross over to compartment 25 and join said primary coil at compartment 25 to form a continuous said primary coil.

Referring to FIG. 2, two magnetic elements 14a and 14b shown in FIG. 3b are disposed over outer flanges 21 and 24. Magnetic element 14a is disposed over flange 21, in the same circumferential position as magnetic element 13a. Magnetic elements 14a is disposed in parallel position to magnetic element 13a, and extends approximately 180 from notch 27 to notch 28. Section of primary coil 16 is enclosed between magnetic elements 13a and 14a (see FIG. 2).

Magnetic element 14b is disposed over flange 24, in the same circumferential position as magnetic element 13b. Magnetic element 14b is disposed in parallel position to magnetic element 13b, and extends from notch 27 to notch 28. Section of primary coil 16 is enclosed between magnetic element 13b and magnetic element 14b. Magnetic element 13a is designated as first magnetic element, magnetic element 13b is designated as second magnetic element. Magnetic element 14a is designated as third magnetic element, magnetic element 14b is designated as fourth magnetic element.

In operation, an alternating current is applied to primary coil 16. Referring to FIG. 1, three magnetic flux flows will be generated. When the core 20 angular position is as shown in FIG. 1, the magnetic coupling between core 20 and magnetic elements 14a and 13a is at a maximum, the first flux path will be as follows: core 20, magnetic element 13a, shell 11, magnetic element 14a and back to core 20. Said first flux path is designated as first magnetic circuit. The output voltage measured at the terminals of secondary coil 18, V 18 will be at its maximum (see FIG. 8).

Since core 20 angular position as shown in FIG. 1 does not magnetically couple magnetic elements 13b and 14b, the voltage measured at the terminals of secondary coil 17, V 17 generated by the second flux path which is: core 20, shell 11, magnetic element 13a, the secondary coil 17 will be low (see FIG. 8).

The third flux path will be: core 20, shell 11, magnetic element 14a and back to core 20. Since the number of turns of secondary coil 17 is approximately equal to the number of turns of secondary 18, and said secondary coils are connected in series opposition, the total output voltage VS generated by the third flux path will be approximately equal to zero.

The output voltage measured at the terminals of the secondary circuit, at the core 20 position shown in FIG. 1, will be at its maximum level, VS=V18–V17 as shown in FIG. 9, where the angular position of core 20 in relation to stator 100 is 90°.

When core 20 is rotated 180° from its position shown in FIG. 1, the magnetic-coupling, designated as second magnetic circuit comprises of: core 20, magnetic element 13b, shell 11 magnetic element 14b. In this case V17 will be high and V18 will be low. VS will be V18–V17, again at a maximum level, however at a reversed polarity (VP to VS phase angle reversed), as shown in FIG. 9, where core 20 angular position is 270°. A change in said angular position will cause an increase in the magnetic coupling of one section of primary coil 16, in compartment 26, and secondary coil 18, and will cause a decrease in the magnetic coupling of the other section of primary coil 16 in compartment 25, and secondary coil 17. FS=V18–V17, (FIG. 9), will indicate the angular position of rotor 105 in relation to stator 100.

When core 20 is rotated 90° away from its angular position shown in FIG. 1, refer to FIG. 2 and FIG. 2a, the magnetic coupling between core 20, magnetic element 13a, shell 11 and magnetic element 14a will be equal to the magnetic coupling between core 20, magnetic element 13b, shell 11 and magnetic element 14b. Therefore, primary coil 16 will generate two equal, alternating magnetic flux flows through secondary coil 17 and secondary coil 18. Therefore, V17=V18, and VS=V18–V17=0. Said core 20 position is defined as the null position of the Rotary Variable Differential Transformer. Said core 20 position shown in FIG. 9 is 0°.

When core 20 is rotated 180° from said 0° position, shown in FIG. 2 and FIG. 2a, V17 will be equal to V18 and VS will be equal to zero. Said core 20 position of the Rotary Variable Differential Transformer, as shown in FIG. 9, is 180°.

Referring to FIG. 3c. FIG. 3c illustrates RVDT housing 70, the assembly of shell 11 and washers 15. FIG. 3c illustrates housing 70 axis 71, and housing 70 axial direction 72.

Referring to FIG. 3d. FIG. 3d illustrates RVDT housing 73, the assembly of shell 11, two inner washer 15, formed of ferromagnetic material, and two external washers 15a, formed of electrically conductive material. FIG. 3d illustrates housing 73 axis 71 and housing 73 axial direction 72.

Referring to FIG. 3e and FIG. 3ee. FIG. 3e illustrates the front view of washer 15. FIG. 3ee illustrates the side view of washer 15.

Referring to FIG. 3f. FIG. 3f illustrates an axial cross section of coil form 12, showing First compartment 26, Second compartment 66, Third compartment 25. Also, showing First position 203, Second position 204, Third position 205 and Fourth position 206. Also shown, are coil form axis, 113 and coil form axial direction 114.

Referring to FIG. 3g. FIG. 3g illustrates a radial cross section of coil form 12 along the line C—C, showing First position 203, Second position 204, and angle 207, approximately 180° of arc.

Referring to FIG. 3h. FIG. 3h illustrates a radial cross section of coil form 12 along the line D—D, showing Third position 203, Fourth position 206, and angle 208, approximately 180° of arc.

Referring to FIG. 3i. FIG. 3i illustrates a partial cross section of RVDT 210. Shown are: First magnetic circuit 300, including core 20, magnetic element 13a, shell 11 and magnetic element 14a. Magnetic flux will flow through core 20 to magnetic element 13a, to shell 11, to magnetic element 14a, and will join magnetic flux in core 20 to form a continuous magnetic flux flow. Also shown, Second magnetic circuit 301 including core 20, magnetic element 13b, shell 11 and magnetic element 14b. Magnetic flux will flow through core 20 to magnetic element 13b, to shell 11, to magnetic element 14b, and join magnetic flux in core 20 to form a continuous magnetic flux flow.

Referring to FIG. 3j and FIG. 3jj. FIG. 3j illustrates side view of core 20. FIG. 3jj illustrates front view of core 20.

Referring to FIG. 3k and FIG. 3kk. FIG. 3k illustrates side view of rotor 105, the assembly of core 20 and shaft 19. FIG. 3kk illustrates the front view of rotor 105, the assembly of core 20 and shaft 19.

Referring to FIG. 4, the second embodiment of the invention. It is an RVDT 60, comprised of a stator assembly 101 and a rotor assembly 106. The stator assembly 101 of RVDT 60 shown in FIG. 4 is identical to the stator assembly 100 of RVDT 10 shown in FIG. 1 and FIG. 2, the first embodiment of the invention. Core 61, disposed for rotation within the hollow stator assembly 101 and provides magnetic coupling between primary 16 and secondary coil 18.

In operation, alternating current applied to primary coil 16 will generate magnetic flux that will encircle secondary coil 18, located in compartment 26. Said magnetic flux will flow through core 61, magnetic element 13a, shell 11 and magnetic element 14a.

Referring briefly to FIG. 8, the level of secondary voltage V18 is at a maximum, for core 61 angular position as shown in FIG. 4.

When core 61 is rotated 180° from said angular position, the level of secondary voltage V18 will be at a minimum, since magnetic element 14a is shaped as shown in FIG. 3a and it is disposed over one half of flange 21 shown in FIG. 4.

The level of secondary voltage V17 will be low through core 61 angular displacement of 360°. The gap between core 61 and magnetic element 14b is large as shown in FIG. 4. Therefore, secondary voltage VS shown in FIG. 8, VS=V18–V17 over core 61 angular displacement of 360° will be as shown in FIG. 11.

Referring to FIG. 5, the third embodiment of the invention. It is an RVDT 50 comparing of a stator 104 and a rotor 105.

The RVDT 50 shown in FIG. 5 is identical to RVDT 10 shown in FIG. 1 and FIG. 2 with the exception of secondary coil 17 that is located in compartment 25 was replaced by secondary coil 51.

In operation, the performance of RVDT 50 is similar to the performance of RVDT 10 shown in FIG. 1 and FIG. 2. The difference between RVDT 50 and RVDT 10 is the number of turns of secondary coil 51. Said number of turns can be varied from zero turns to the number of turns of secondary coil 18.

Referring to FIG. 6, the fourth embodiment of the invention. It is an RVDT 30, comprising of stator 102 and a rotor 105.

RVDT 30 shown in FIG. 6 is identical to RVDT 10 shown in FIG. 1 and FIG. 2, except that stator 100 of FIG. 1 was changed to stator 102 of FIG. 6. The changes are as follows:

1. Magnetic elements 14a and 14b were eliminated.

2. Said washers can be made of one of the following materials:

Non magnetic non conductive.

Ferromagnetic.

Electrically conductive material.

The effects of change #1 and #2 will cause lower output voltage VS as a function of the angular displacement of rotor 105. Also, said changes will reduce the manufacturing cost of stator 102.

In operation, the performance of RVDT 30 shown in FIG. 6, is similar to the performance of RVDT 10 shown in FIG. 1 and FIG. 2. An alternating current applied to primary coil 16 will generate an alternating magnetic flux, that will flow: core 20, magnetic element 3a, shell 11 and back through radial path 15a, to core 20. Said radial path 15a, can be one of three alternatives (see change #2).

a. Non electrically conductive, non magnetic material.
b. Ferromagnetic material.
c. Electrically conductive material.

Referring to said alternative a. Said VS will diminish, since said radial path 15a and 15b will cause a large gap in the path of said magnetic flux.

Referring to said alternative b. Said VS will diminish since part of said magnetic flux will flow from core 20 into said radial path 15b and will encircle secondary coil 17, and thus, will cause a reduction in said output voltage VS.

However, said alternative b will form a magnetic and electrostatic shielded stator assembly 102.

Referring to said alternative c. Said VS will diminish, since radial path 15a and 15b will cause a large gap in said path of said magnetic flux. However, said alternative c will form an eddy current shield, that will confine said magnetic flux within stator assembly 102, and also, will form an electrostatic shield.

Referring to FIG. 7, RVDT 40 shown in FIG. 7 is the fifth embodiment of this invention. RVDT 40 illustrated in FIG. 7 is identical to RVDT 30 shown in FIG. 6, except that stator 102 illustrated in FIG. 6 was changed to stator 103 shown in FIG. 7.

The said changes are as follows:

3. Flange 21 and flange 22 were eliminated and replaced by flange 33, dividing coil form 12 into two equal compartments; compartment 25 and compartment 26.

4. Magnetic element 13a and magnetic element 13b was eliminated.

5. Washers 15 can be eliminated or made of electrically conductive material or ferromagnetic material.

The effects of said changes listed as #3, #4 and #5, will result in the following:

a. Reduction in cost of materials.
b. Reduction in cost of assembly.
c. Lower output voltage sensitivity, said sensitivity is defined as volts output per degree of angular displacement per volts input.
d. Increase of non linearity of output voltage VS, versus angular displacement.

In operation, the performance of RVDT 40 illustrated in FIG. 7 is similar to the performance of RVDT 30, illustrated in FIG. 6.

Referring to the fourth embodiment of this invention shown in FIG. 6. Said embodiment can be modified by replacing core 20 shown in FIG. 6, with core 61 shown in FIG. 4. Also, said embodiment can be modified by replacing secondary coil 17, shown in FIG. 6 with secondary coil 51 shown in FIG. 5.

Referring to the fifth embodiment of this invention shown in FIG. 6, said embodiment can be modified by replacing core 20 shown in FIG. 7 with core 61, shown in FIG. 4. Also, said embodiment can be modified by replacing secondary coil 17, shown in FIG. 7, with secondary coil 51 shown in FIG. 5.

What is claimed is:

1. A Rotary Variable Differential Transformer comprised of: a housing, said housing including a shell and two washers; a hollow cylindrical coil form made of non magnetic material, said coil form rigidly disposed within said housing, axis of said coil form and axis of said shell substantially coincide; first and second secondary coils wound of elecrically conductive wire, circumferentially and adjacent to each other about said coil form; said first secondary and said second secondary coils are connected in series opposition relationship; a primary coil wound of electrically conductive wire circumferentially, adjacent to said first secondary coil about said coil form, from a first position to a second position; said primary coil cross over at said second position, substantially in a said axial direction, to third position adjacent to said second secondary coil and wound circumferentially adjacent to said second secondary coil about said coil form to fourth position and thereafter cross over, substantially in said axial direction, and join said primary coil at said first position to form a continuous said primary coil; an elongated ferromagnetic core rotatably supported within said hollow coil form, said ferromagnetic core being symmetric with respect to said axis; said ferromagnetic core provides, upon rotation, a variable magnetic coupling between said primary coil and said first secondary coil, and between said primary coil and said second secondary coil.

2. A Rotary Variable Differential Transformer in accordance to claim 1, said shell is made of ferromagnetic material.

3. The invention of claim 2 wherein: said first secondary coil substantially equal to said second secondary coil; said primary coil extends substantially arcuately from said first position to said second position about said coil form for substantially 180° of arc; said primary coil extends arcuately from said third position to said fourth position about said coil form substantially 180° of arc.

4. The invention of claim 3 wherein said coil form comprised of first, second, third and fourth flange members radiating from central cylinder of said coil form; said first and said second flange members form first compartment; said second and said third flange members form second compartment; said third and said fourth flange members form third compartment; said first secondary coil wound of insulated, electrically conductive wire, circumferentially within said first compartment about said central cylinder of said coil form; said second secondary coil wound of insulated, electrically conductive wire, circumferentially within said third compartment about said central cylinder of said coil form; said primary coil wound circumferentially adjacent to said first secondary coil within said first compartment, about said coil form, from said first position to said second position, said primary coil cross over at said second position in substantially said axial direction to said third position and wound circumferentially adjacent to said second secondary coil within said third compartment, about said coil form to said fourth position and thereafter cross over in substantially said axial direction, and join primary coil at said first position to form a continuous said primary coil; a first magnetic element and a second magnetic element disposed about said central cylinder of said coil form; said magnetic elements radiating from central cylinder of said coil form within said second compartment; said first magnetic element extending arcuately from said first position to said second position about said coil form for substantially 180° of arc; said second magnetic element extending arcuately from said third position to said fourth position about said coil form for substantially 180° of arc; said first magnetic element and said second magnetic element disposed about said ferromagnetic core and said ferromagnetic shell comprised of first and second magnetic circuit; said first magnetic circuit providing magnetic coupling between said primary coil and said first secondary coil; said second magnetic circuit providing magnetic coupling between said primary coil and said second secondary coil; said ferromagnetic core providing upon rotation, a variable magnetic coupling between said primary coil and said first secondary coil, and between said primary coil and said second secondary coil.

5. The invention of claim 4 wherein said magnetic circuits comprised of third and fourth ferromagnetic coupling elements; said third and said fourth magnetic elements with third magnetic element and fourth magnetic element; said third magnetic element and said fourth magnetic element disposed about central cylinder of said coil form; said magnetic elements radiating from central cylinder of said coil form; said third magnetic element rigidly attached to external surface of said first flange; said third magnetic element extends arcuately from said first position to said second position about said central cylinder of said coil form for substantially 180° of arc; said fourth magnetic element rigidly attached to external surface of said fourth flange; said fourth magnetic element extends arcuately from said third position to said fourth position about said central cylinder of said coil form for substantially 180° of arc; said first magnetic element and said third magnetic element disposed about said ferromagnetic core and said ferromagnetic shell comprising first magnetic circuit; said second magnetic element and said fourth magnetic element disposed about said ferromagnetic core and said ferromagnetic shell, comprising second magnetic circuit; said first magnetic circuit providing magnetic coupling between said primary coil and said first secondary coil; said second magnetic circuit providing magnetic coupling between said primary coil and said second secondary coil; said ferromagnetic core providing, upon rotation, a variable magnetic coupling between said primary coil and said first secondary coil, and between said primary coil and said second secondary coil.

6. The invention of claim 3 wherein the number of turns of said first secondary coil exceeds the number of turns of said second secondary coil.

7. The invention of claim 4 wherein the number of turns of said first secondary coil exceeds the number of turns of said second secondary coil.

8. The invention of claim 5 wherein the number of turns of said first secondary coil exceeds the number of turns of said second secondary coil.

9. The invention of claim 4 wherein said two washers are formed of ferromagnetic material.

10. The invention of claim 4 wherein said two washers are formed of electrically conductive material.

11. The invention of claim 4 wherein said two washers are formed of non-electrically conductive, non-ferromagnetic material.

12. The invention of claim 5 wherein two washers are formed of non-ferromagnetic, non-electrically conductive material.

13. The invention of claim 4 wherein said ferromagnetic core providing, upon rotation, a variable magnetic coupling between said primary coil and said first secondary coil.

14. The invention of claim 5 wherein said ferromagnetic core provides, upon rotation, a variable magnetic coupling between said primary coil and said first secondary coil.

15. The invention of claim 5 wherein said two washers are formed of electrically conductive material.

16. The invention of claim 13 wherein said two washers are formed of ferromagnetic material.

17. The invention of claim 14 wherein said two washers are formed of electrically conductive material.

18. The invention of claim 14 wherein said two washers are formed of non-electrically conductive, non-ferromagnetic material.

19. The invention of claim 4 wherein each of said two washers, comprised of an inner washer formed of ferromagnetic material, and an external washer formed of electrically conductive material, said inner washers disposed about said outer flanges of said coil form, said external washers disposed about said inner washers.

* * * * *

UNITED STATES PATENT AND TRADEMARK OFFICE
CERTIFICATE OF CORRECTION

PATENT NO. : 5,701,114
DATED : Dec. 23, 1997
INVENTOR(S) : JACOB CHASS

It is certified that error appears in the above-identified patent and that said Letters Patent is hereby corrected as shown below:

Column 2, Line 51. Change 180 to: 180°.
Column 3, Line 36. Change 116 to: 16.
Column 3, Line 57. Change 180 to: 180°.
Column 4, Line 27. Change 180 to: 180°.
Column 5, Line 15. Change FS to: VS.
Column 7, Line 9. Change 3a to: 13a.
Column 7, Line 39. Change was to: were.
Column 9, Line 14. Change ferromagnetic coupling to: magnetic.
Column 9, Line 15,16. Eliminate: said third and said fourth magnetic elements with third magnetic element and fourth magnetic element .

Signed and Sealed this

Twentieth Day of October, 1998

Attest:

BRUCE LEHMAN

Attesting Officer

Commissioner of Patents and Trademarks